(12) United States Patent
Gardner

(10) Patent No.: US 7,876,849 B2
(45) Date of Patent: Jan. 25, 2011

(54) DATA TRANSMISSION METHOD AND APPARATUS USING NETWORKED RECEIVERS HAVING SPATIAL DIVERSITY

(75) Inventor: Steven H. Gardner, San Diego, CA (US)

(73) Assignee: Viasat, Inc., Carlsbad, CA (US)

( * ) Notice: Subject to any disclaimer, the term of this patent is extended or adjusted under 35 U.S.C. 154(b) by 1039 days.

(21) Appl. No.: 11/441,697

(22) Filed: May 25, 2006

(65) Prior Publication Data

US 2007/0274410 A1 Nov. 29, 2007

(51) Int. Cl.
*H04B 7/02* (2006.01)

(52) U.S. Cl. .................. 375/267; 375/260; 375/347; 375/349; 375/220

(58) Field of Classification Search .............. 375/267, 375/260, 347, 349, 220
See application file for complete search history.

(56) References Cited

U.S. PATENT DOCUMENTS

| | | | |
|---|---|---|---|
| 4,052,670 A | 10/1977 | Watanabe et al. | |
| 5,182,642 A * | 1/1993 | Gersdorff et al. | 375/240.01 |
| 5,294,930 A | 3/1994 | Li | |
| 5,559,757 A | 9/1996 | Catipovic et al. | |
| 5,627,499 A | 5/1997 | Gardner | |
| RE35,553 E | 7/1997 | Li | |
| 5,978,365 A * | 11/1999 | Yi | 370/331 |
| 6,038,455 A | 3/2000 | Gardner et al. | |
| 6,278,396 B1 | 8/2001 | Tran | |
| 6,536,553 B1 | 3/2003 | Scanlon | |
| 6,642,887 B2 | 11/2003 | Owechko | |
| 6,775,251 B1 * | 8/2004 | Wiedeman et al. | 370/316 |
| 6,792,258 B1 | 9/2004 | Nokes et al. | |
| 6,811,113 B1 | 11/2004 | Silansky et al. | |
| 6,853,694 B1 | 2/2005 | Beaudin et al. | |
| 6,854,059 B2 | 2/2005 | Gardner | |
| 6,862,434 B2 | 3/2005 | Wallace et al. | |
| 2001/0033248 A1 | 10/2001 | Owechko | |
| 2002/0010870 A1 | 1/2002 | Gardner | |
| 2003/0164794 A1 | 9/2003 | Haynes et al. | |
| 2004/0001430 A1 | 1/2004 | Gardner | |
| 2004/0081127 A1 | 4/2004 | Gardner et al. | |
| 2004/0229563 A1 * | 11/2004 | Fitton et al. | 455/7 |
| 2006/0083263 A1 * | 4/2006 | Jagadeesan et al. | 370/487 |
| 2006/0256792 A1 * | 11/2006 | Kwong et al. | 370/394 |

FOREIGN PATENT DOCUMENTS

EP 0881783 A 12/1998

* cited by examiner

*Primary Examiner*—Shuwang Liu
*Assistant Examiner*—Kabir A Timory
(74) *Attorney, Agent, or Firm*—Townsend and Townsend and Crew LLP

(57) ABSTRACT

A data transmission method and apparatus are disclosed using receivers having spatial diversity, with the receivers communicating with a common client via network communication. Improved systems and methods for data transmission according to the disclosed method and apparatus include at least: a transmission source for transmitting a data signal; a first receiver for receiving the data signal; a second receiver for receiving the data signal, wherein the second receiver is spaced apart from the first receiver thereby providing spatial diversity; and a communication network for facilitating communication between a client and at least the first receiver and the second receiver, as needed, wherein the client is capable of analyzing individual data signals received by the first and second receivers and forming a composite signal of a higher quality than the quality of the individual data signals.

19 Claims, 2 Drawing Sheets

DATA TRANSMISSION METHOD AND APPARATUS USING NETWORKED RECEIVERS HAVING SPATIAL DIVERSITY

BACKGROUND

1. Field

The present disclosure relates to improvements in data transmission and reception using networked receivers having spatial diversity.

2. Description of Related Art

Reliable and accurate transmission of information is paramount in modern society. Not only is transmission of information from terrestrial-based sources widespread, but transmission of information from aerial-based sources is also widespread, becoming more so with time. As an example, aerial-based sources such as Unmanned Aerial Vehicles (UAVs) are gaining broad acceptance in the military as a means of acquiring intelligence information from remote locations where the risk of sending manned vehicles is great.

Often, information transmitted from aerial-based sources takes the form of imagery. For example, one of the most common uses of UAVs is to obtain imagery information, either from cameras operating in the visible light or infra-red ranges, or from small aperture radars or other imagery systems. The imagery information may take the form of either motion-based imagery (video) or still images.

In many applications, there is a strong desire to provide the ability for ground-based analysts to view transmitted imagery in real time. Thus, many UAV video systems digitize the imagery, compress it using a variety of industry-standard or non-standard methods, and transmit resulting data to the ground via a radio frequency (RF) downlink. On the ground, the data may be decompressed and returned to a format that is suitable for viewing on a video monitor.

While many types of information can be reliably and accurately transmitted, transmission of imagery from aerial-based sources is often particularly vulnerable to errors. One common problem in such systems stems from the fact that the RF downlink is typically far less reliable than transmission media commonly used for the transport of digital video from terrestrial-based sources in the consumer marketplace (e.g., cable, storage devices such as CDs, DVDs, etc.). Consequently, the bit stream received from the RF downlink is often subject to errors (i.e., bit errors).

In order to efficiently transmit imagery information, data forming the image is typically compressed before transmission and subsequently decompressed at the receiver. As a result of video compression, a small number of bit errors present in the data can cause significant disruption to the video displayed. For example, given a bit error rate of one in a hundred million, video is disrupted on average once every half minute. At a bit error rate of one in 10 million, video is disrupted on average once every 3 seconds. At a bit error rate of one in 1 million, video is subject to nearly constant disruption. Minimization of bit errors is thus important in the transmission of imagery information, particularly when the information is subjected to video compression.

Errors in the bit stream are typically caused by several mechanisms. These include errors arising from the following: front end noise in the receiver, multipath reflections, interference, and shadowing. Each mechanism alone can introduce substantial errors in the bit stream. Often, however, multiple errors are introduced in the bit stream by simultaneous operation of one or more mechanisms.

With respect to errors introduced by front end noise present in the receiver, it should be noted that the same amount of noise is always present at the receiver. When the received signal is weak (typically because it has propagated for a long distance), however, the front end noise may be sufficiently large to degrade the signal. This phenomenon affects the bit stream in much the same way that reception of a signal from a distant commercial broadcast radio station is negatively affected by noise. Receiver "sensitivity" is a measure of receiver quality in this regard. Receiver sensitivity comprises a minimum signal level sufficient to prevent the receiver front end noise from causing an unacceptable number of bit errors.

With respect to multipath reflections, it should be noted that the received signal often arrives at a receiver antenna through not only a direct path via the air, but also through a secondary path. The secondary path typically arises due to reflection of the signal from the ground (or other object(s)) present in the forefront of the receiver antenna. As a result, a transmitted signal often arises at the receiver in the form of two signals (a first signal being direct, and a second signal being a reflection). Because the two signals travel paths having different lengths, they can arrive at the antenna with different phasing. In some cases the phases are the same, in which case the reflection signal serves to boost the strength of the direct signal. In other cases the phases are misaligned. When the phases are misaligned the sum of the two signals is attenuated. When the misaligned phases cause the composite sum of the signal to be attenuated, the signal is said to be "in a null." If the signal strength in the null is too close to the sensitivity of the receiver, bursts of errors often occur when the signal enters the null. This can occur in a time varying manner, as when, for example, an aircraft signal source moves from one location to another.

For purposes of the present disclosure, interference comprises unwanted signals received or introduced by other sources. These other sources may be generated intentionally by a hostile party trying to disrupt communication (e.g., by a jammer) or they may be generated unintentionally by a friendly origin that lacks adequate control over the frequency spectrum that it occupies. One example of the latter source is pulsed radar. If the interference signal at the receiver antenna is close in magnitude to that of the desired signal, errors can be introduced into the bit stream.

In general, when transmitting, the transmit antenna is usually attached to the source (e.g., an aircraft) in some fashion. When transmitting from an aerial-based source such as an aircraft, it is virtually impossible to avoid mounting the antenna in a position where at some particular attitude of the aircraft, the signal path from the aircraft antenna to the ground antenna does not pass through the aircraft structure. In this case, the aircraft structure may significantly attenuate the signal received by the ground-based receiver, which can cause the signal strength received to fall below the receiver sensitivity level. This error-causing mechanism is referred to as "shadowing".

There are many techniques that can be used to combat errors in such environments. These include the following: increasing transmitter power level, reducing the bit rate, use of coding such as forward error correcting (FEC) coding, use of directional antennas with antenna pointing, and use of diversity techniques. More than one technique for combating errors can be used for increased performance.

Increasing transmitter power levels allows the transmitted signal to experience more attenuation before it is negatively impacted by the receiver front end noise or interference. In this manner, the transmitter power level is increased to a level such that, when attenuated, the signal strength at the receiver remains sufficiently large to avoid being significantly impacted by noise or interference.

Reducing transmission bit rate also works to combat errors in a manner similar to increasing transmitter power levels. The performance of any communication link is a function of how much energy is available at the receiver per bit of data (i.e., energy per bit). If the bit rate of a signal is reduced, and everything else about the communication link remains unchanged, the energy per bit increases in direct proportion to the reduction in bit rate. This increase provides enhanced margin between the power of the desired signal and that of the receiver front end noise.

Coding, such as Forward Error Correction (FEC) coding, generally involves a digital signal processing technique that allows correction of a large percentage of the bit errors in a corrupted bit stream. However, the benefits come at the cost of requiring transmission of some additional overhead data bits. The overhead data bits are generated as a function of the information being transmitted, and they are added to the original data bits with the intent that the code formed from the combination of original and overhead data bits does not allow every possible combination of bits. Because not all bit patterns are possible in the code, a decoder can correct errors in a manner that is analogous to the way misspellings in text are detectable because not all combinations of letters are part of the "code" formed by language itself. FEC is an important tool, but as the channel quality decreases, more and more redundancy must be added to achieve a given level of performance. The required bandwidth for addition of such redundancy is often not available.

According to further variations, FEC coding can be used in conjunction with interleaving. Interleaving is a method of dispersing the effects of errors grouped together so that the FEC (which typically works best when errors are uniformly distributed) can perform adequately.

As noted, using directional antennas with antenna pointing is another known technique for combating interference. If a directional antenna is pointed at a UAV, for example, it provides substantial gain to the desired signal and also provides loss for any interference source that is not transmitting in the same direction as the UAV.

The term "diversity" refers to a family of techniques in which a signal is received in more than one manner, with the assumption that the errors that occur in each receiver are, to some extent, independent. There are a number of known diversity techniques. Most of the diversity techniques involve having more than one receiver operate on the same signal, and having some manner of selecting the result of the receiver that is doing the best job of receiving the signal. Some diversity techniques combine signals from all of the receivers before determining a best estimate of the transmitted data. Typical diversity techniques include those based on the following: frequency diversity, time diversity, and spatial diversity.

In accordance with frequency diversity techniques, the same signal is transmitted and received on two different frequencies. Because the multipath reflection and interference characteristics differ at different frequencies, at any given time, the signal received at one frequency may be acceptable, while the signal received at the other frequency is unacceptable.

In accordance with time diversity techniques, the same signal is transmitted at different times. This technique is beneficial when, for example, interference occurs at a first instant in time but not at another instant in time.

In accordance with spatial diversity techniques, the same signal is received at different spatial locations (such that different paths of signal travel are present). This technique is beneficial when, for example, propagation loss and interference are different at each spatial location where the signal is transmitted or received.

Many diversity systems exist in the art. One of the most widely used examples of diversity receivers is found in base stations for cellular telephony. Cellular telephony base stations typically have multiple antennas and receivers from which the best signal is selected from among the available receivers. The receivers are typically co-located, with the receiving antennas being spaced apart only by a sufficient distance (e.g., less than a few meters) such that multipath reflections that each receiving antenna experiences are unrelated to those experienced by other receiving antennas. The relatively small spacing of receiving antennas in such systems is typically not sufficiently large to combat errors introduced by shadowing and interference.

Another known diversity system is that developed in the late 1980s for use on U.S. Air Force and Navy training ranges (the Range Applications Joint Program Office (RAJPO) Data Link System (DLS)). According to the RAJPO DLS, multiple ground stations positioned at significantly different sites throughout training ranges could be used to collect transmitted downlink information. This system, however, relied upon dedicated line-of-sight (LOS) microwave links to facilitate the transmission of data from the ground stations to a single receiver at a central processing site, where the data was then combined using custom hardware. The links from the ground stations were fully synchronous and timing was thus tightly controlled among the different ground stations. While this system had its benefits, it also had limitations—one of which involved the vulnerable LOS links between the ground stations and the central processing site.

Many systems employing spatial diversity are not capable of differentiating between individual signals and providing the best individual output at a given instant in time based on the signals so received. For example, many known techniques employing spatial diversity rely on equal gain combining whereby all signals are combined together regardless of the strength of any particular individual signal. As another example, many known techniques employing spatial diversity rely on optimal combining whereby the signals are combined proportionally based on their individual strengths.

Data transmission systems may use several and possibly all of the above-described error reduction techniques, or others, at once. Although there are many known ways to effectively implement each of these techniques, there is a continual need for improvements in accuracy and reliability of transmission, particularly when transmitting complex data such as imagery.

The data transmission method and apparatus using networked receivers having spatial diversity provides an improved data transmission system, especially when transmitting complex imagery information.

SUMMARY

The present disclosure provides improved methods and apparatus for data transmission employing spatial diversity and networked communication. Improved methods and apparatus for transmission of data according to the present teachings include at least: a transmission source for transmitting a data signal; a first receiver for receiving the data signal; a second receiver for receiving the data signal, wherein the second receiver is spaced from the first receiver thereby providing spatial diversity; and a network for facilitating communication between a client and at least the first receiver and the second receiver, as needed; and wherein the client is capable of analyzing individual data signals received by the first and second receivers and forming a composite signal of a higher quality than quality of the individual data signals. Using methods and apparatus in accordance with the present disclosure, accurate and reliable data representations and associated imagery are obtainable.

In one exemplary embodiment, the transmission source comprises an aerial-based transmission source. For example, the transmission source may comprise a moving airborne object (e.g., an Unmanned Aerial Vehicle (UAV)). According to exemplary embodiments, the transmitted data signal comprises data associated with imagery (e.g., video or still images), such as, for example, a compressed video transmission.

Although spacing of the receiver will vary depending on a specific application, in exemplary embodiments, the first and second receivers are spaced apart from one another by at least one-hundred meters. In other exemplary embodiments, the first and second receivers are spaced apart from one another by at least one kilometer, and greater than one-hundred kilometers in yet further embodiments. The number of receivers used in any particular system may also vary. Many embodiments include more than two receivers for receiving the data signals.

Networking of the receivers that are spaced to have spatial diversity not only provides efficient communication between the receivers and a client, but it also facilitates accurate and reliable data transmission. In one exemplary embodiment, the network adheres to the well-known Internet Protocol (IP) communication protocol.

Individual data signals received by the first and second receivers may comprise only one data component or they may comprise multiple data components. If the individual data signals are formed from multiple data components, each data component has a quality indicator and a sequence identifier according to one aspect of the present teachings. The quality indicator may be determined using any suitable method, such as, for example, incorporating at least one error-detecting code in the transmitted data signal. In another exemplary embodiment, the quality indicator may be determined using signal-to-noise ratio estimates.

Systems made in accordance with the present teachings are capable of forming composite signals comprising sequential data components from the first and second receivers. The sequential data components comprise those respective data components received from each of the receivers having the highest comparative quality indicators. In this manner, composite signals of essentially error-free sequential data components are obtainable.

Systems made in accordance with the present disclosure are well-suited for use in applications where a reduction in errors introduced during data transmission is desired. According to one method of the present disclosure, a method of transmitting data comprises: transmitting a data signal from a transmission source to at least two receivers, wherein at least one receiver is spaced apart from at least one other receiver, thereby providing spatial diversity; associating a quality indicator with each sequential data component forming the data signal received by each receiver; communicating the data components and associated quality indicators from the receivers to a client as needed using a network; comparing the quality indicators associated with each sequential data component using the client; discarding data components from the receivers other than the data component having the highest quality indicator; and forming a composite signal from the sequential data components having the highest quality indicator. In an exemplary embodiment, the data signal is transmitted from an aerial-based transmission source using a radio frequency downlink.

DETAILED DESCRIPTION

Figure 1:
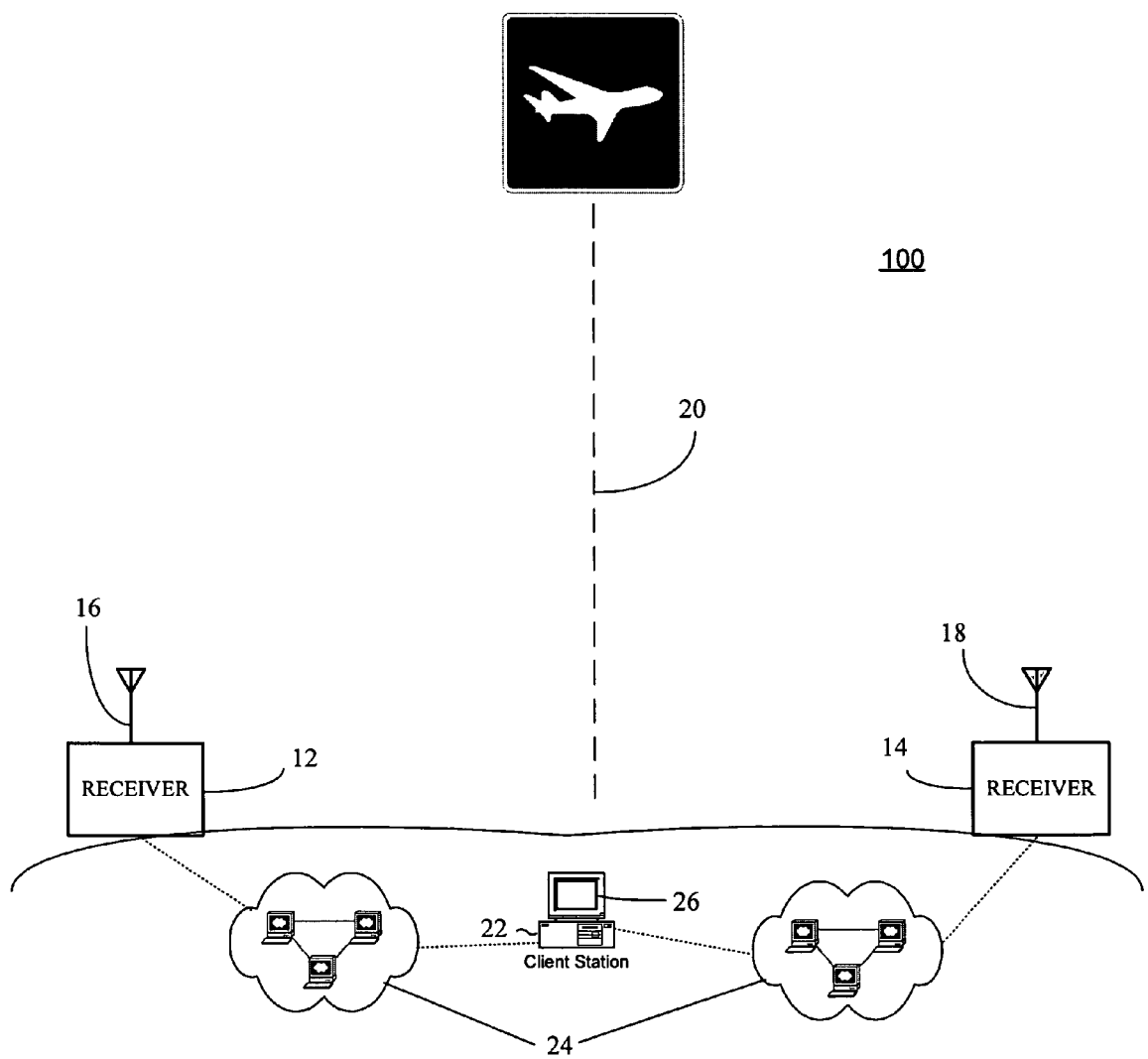
FIG. 1 is a simplified schematic illustration of an exemplary embodiment of a data transmission system wherein data transmission from an aircraft is improved using two receivers having spatial diversity and networked communication.

Improved transmission of data signals is achieved according to the present teachings using spatially diverse receivers and networked communication. At least two receivers, sufficiently spaced apart from each other in order to provide spatial diversity, are adapted for receiving signals from a transmission source. Data so received is provided from each receiver to a client, using network communication, as needed, for compilation into a composite signal that is synonymous with the transmitted signal. The composite signal thus formed is of a higher quality than is the quality of the individual data signals as received by the receivers. In this manner, more accurate and reliable replication of transmitted information is made possible as compared to that associated with conventional systems and related methodology.

The transmission source may comprise any type of communication apparatus. Depending on the location of the transmission source, the transmission source may be, for example, terrestrial-based, aquatic-based, or aerial-based. In an exemplary embodiment, the transmission source is aerial-based (e.g., an unmanned aircraft). Difficulties often experienced in attempting to obtain accurate and reliable aerial-based transmission using conventional systems are significantly reduced according to the present teachings.

Many transmission sources are known and can be effectively used according to the present method and apparatus. Generally, the transmission source operates to transmit data to one or more of the receivers using wireless communication. In an exemplary embodiment, data travels from the transmission source to the receivers using suitable waveforms (e.g., acoustic or electromagnetic) based on the medium through which the data is transmitted. Thus, it is to be understood that the transmission source will vary according to the application of the disclosed method and apparatus. For example, the transmission source can be one of a number of common wireless communication devices such as a portable phone, a cellular telephone connected to a laptop computer running Internet Protocol (IP)-based Web-browser applications, a cellular telephone with associated hands-free apparatus, a personal data assistant (PDA) running IP-based Web-browser applications, a wireless communication module incorporated into a portable computer, or a fixed location communication module such as that found in a wireless local loop or meter reading system.

While the transmission source may be terrestrial-based, applicable range of the system is expanded when using aerial-based transmission sources, particularly those operating at altitudes of more than fifteen-hundred meters, and more particularly more than approximately two-thousand meters. Therefore, an exemplary embodiment of the present disclosed method and apparatus utilizes an aerial-based transmission source. For example, the present disclosure is particularly well-suited for combating problems associated with transmission of data from moving airborne objects, such as Unmanned Aerial Vehicles (UAVs), including drones, airplanes, balloons, dirigibles, gliders, helicopters, rockets, satellites, and the like. Due to their role in effective reconnaissance, applications involving UAVs, in particular, are envisioned to reap substantial benefits according to the present teachings. In an exemplary embodiment, the transmission source is capable of transmitting data via electromagnetic waves, such as using a radio frequency (RF) downlink. Typically, transmission sources of this type are configured to use at least one antenna in order to downlink data.

As understood by those of ordinary skill in the communications arts, information transmitted from a transmission source is obtainable using any suitable and convenient method and apparatus. The information may be obtained using the transmission source itself (e.g., as with a portable phone), or it may be obtained using an external device from which the information is conveyed to the transmission source.

The type of data embodied within the transmitted data signal varies according to the application. Data includes any type of information suitable for processing. For example, the data can embody textual or image-based information. In an exemplary embodiment, the transmitted signal comprises data that is associated with imagery information. For example, the imagery data can be that of a motion-based (i.e., video) or still image. Imagery information can be obtained for transmission using imagery devices such as cameras (e.g., those operating in the visible light or infrared ranges), video recorders, radars (e.g., those having a small aperture), or other similar apparatus.

Depending on the application and desired performance, the data can be transmitted from the transmission source in a compressed or uncompressed format. In an exemplary embodiment, the data is digitized. Particularly when there are bandwidth constraints, it is advantageous to transmit the data in a compressed format such as that associated with compressed video transmission. In this embodiment, and others, the image is digitized prior to transmission. According to further aspects of this embodiment, the digitized image is compressed prior to transmission. Any of a number of industry-standard or other methods can be used to digitize and compress the image data in this manner.

Systems made in accordance with the present method and apparatus utilize at least two receivers. In one exemplary embodiment, such systems have only two receivers. In further embodiments, such systems have three, four, five, six, or more receivers. While benefits afforded by the described transmission system are generally augmented when using more than two receivers, as described herein, such systems need only utilize two receivers. Although they need not be identical, each of the receivers is capable of receiving the signal transmitted from the transmission source. In addition, the receivers should be capable of networked communication such that each receiver is capable of relaying data to the client.

In one exemplary embodiment, the receivers are sufficiently spaced apart from one another in order to provide spatial diversity. According to the present disclosure, spatial diversity varies according to the application and components used within the system. Spatial diversity allows the combining of the best results from receivers placed such that they experience different degradation of the transmitted signal from propagation distance, multipath reflections, shadowing and/or interference. Generally at least two receivers in the system are spaced at least one-hundred meters apart to achieve the desired benefits. Typically, at least two receivers in the system are spaced at least one kilometer apart. In other applications, at least two receivers are spaced at least ten kilometers apart. In one embodiment, at least two receivers in the system are spaced at least one-hundred kilometers apart. In an exemplary embodiment, at least two receivers in the system are sufficiently spaced apart in order to reduce errors introduced by propagation distance, multipath reflections, shadowing and/or interference by an amount that it at least one order of magnitude. In further exemplary embodiments, at least two receivers are sufficiently spaced apart in order to reduce such errors by at least two orders of magnitude.

In select embodiments, more than two receivers are used, with the spacing between each of the receivers being that needed to substantially reduce errors in transmission introduced by multipath reflections, shadowing and/or interference, as described above. For example, three receivers can be used, wherein the three receivers are approximately equally spaced apart from each other, depending on the application and the individual components of the system. Similarly, other applications can use four or more receivers approximately equally spaced apart from each other, again depending on the application and individual system components. Alternatively, if beneficial for a particular application, three or more receivers can be used, with only two to less than the total number of receivers being approximately equally spaced apart. Benefits of the disclosed method and apparatus are generally increased with not only an increasing number of receivers, but also with an increasing number of such receivers being optimally positioned apart from each other in a manner that minimizes the chances that detrimental effects of multipath reflections, shadowing and/or interference on the transmitted signal received by one receiver will also detrimentally affect the signal received at the other receiver or receivers.

Each of the first and second receivers is adapted for receipt of transmitted data according to the overall configuration of the system. In one embodiment, for example, each of the receivers includes at least one antenna for receipt of a signal transmitted via an RF downlink. In one such embodiment, each of the receivers includes an antenna adapted to receive an RF signal from the transmission source.

If the transmitted data is compressed prior to transmission, the data generally requires decompression in order to effectively display the data after its receipt by the receiver. Decompression can occur either at the receiver, prior to the data being communicated to the client, or it can occur at some later point in time and location (e.g., at the client, after being accessed via the network). Decompression techniques are well known to those of ordinary skill in the data communications art. Any suitable and convenient data decompression technique may be used if decompression is necessary or desired.

In one exemplary embodiment, each of the receivers is designed to be network-capable. This can be accomplished, for example, using a computer-based receiver. In this manner, a remote or local client can easily access and acquire data from each of the receivers via a network (e.g., a network based on the well known Internet Protocol (IP)). In one embodiment of the present disclosed method and apparatus, the communication network facilitates communication between each of the receivers and the client. The client is thereby able to efficiently and reliably form a composite signal of optimal quality.

According to one embodiment of the disclosed method and apparatus, at least one receiver also functions as the client (i.e., functions of the receiver and client are integrated into one physical component without requiring network communication therebetween). Thus, reference to receipt of data by a receiver and network transmission and/or communication to the client by that receiver should be interpreted accordingly.

In this embodiment, the client uses its own locally received version of the data and subsequently combines it with data it receives from other receivers via the network.

In order to form the composite signal, each of the receivers provides data to the client via the communication network as needed, based on the individual data signal received thereby. In one embodiment, the individual data signals comprise multiple data components of a predetermined size, e.g., frames, packets, or subpackets (all hereinafter referred to generally as "frames" for ease of reference). Depending on the type of transmitted data, the individual data signal can alternatively comprise only one component. In one embodiment, the same sized data components are first transmitted from the transmission source before the receiver provides the data components to the client (e.g., through network communication or, in the case of the receiver and client being integrated into one component, locally).

In an exemplary embodiment, each of multiple data components forming the individual data signals includes an associated quality indicator and a sequence identifier. When the data signal comprises only one data component, that data component also includes an associated quality indicator.

Any suitable networking methods and apparatus can be employed in facilitating communication between the receivers and the client in order to allow the client to utilize the individual data signals received by each receiver. In an exemplary embodiment, data components from the individual data signals are provided to the client via a communication network, and the data components are formatted as packets encapsulated into frames using a suitable communication protocol. The data components may be provided using acknowledged protocols such as Transmission Control Protocol/Internet Protocol (TCP/IP), IP, or unacknowledged protocols such as User Datagram Protocol (UDP). It is to be understood that as technology evolves, data components used to practice the disclosed method and apparatus may be capable of being provided to the client via a network using previously unknown protocols without departing from the spirit or scope of the present teachings. Likewise, the same holds true with respect to other aspects of the disclosed method and apparatus.

Data components may be transmitted in a multicast or unicast fashion. Because the client combines multiple data components sequentially in forming the composite signal, potential problems caused by disruptions during transmission and or networking are mitigated. For example, if data components from individual receivers are lost or received by the receiver and/or the client out of order, the client is still able to form a complete and sequential composite signal based on data received from all of the receivers in the system.

The client (e.g., a computer executing software that processes and displays the data) receives the data comprising the individual data signals obtained from each receiver. For each data component (e.g., sequential frame or individual data signal), the client compares the quality indicators provided by each receiver in conjunction with the particular data component, keeps the data component having the highest quality, and discards the corresponding data components received from the other receivers. The client then makes a composite signal (e.g., data stream) from the series of highest quality data components. The composite signal thus formed is typically of a higher quality than that of the overall individual data signal obtainable from any one of the receivers alone. This is possible because the composite signal is derived from individual data components forming the individual data signals and that are determined to be of the highest quality.

The data component quality indicator allows the client to analyze and select the respective highest quality data components from the receivers. A data component quality indicator can be determined by, for example, selection of the data component having a lower number of data bit errors and/or selection of the data component associated with the receiver having the highest signal-to-noise ratio (SNR) at the associated time.

Any suitable method of determining and associating a quality indicator with the data components and then representing same to the client can be used. According to one embodiment, transmitted data may include one or more of many common types of coding well known in the field of data communications. For example, the transmitted data can include an error-detecting code (EDC) in the form of a predetermined number of check bits added to each data component. Examples of such codes are the cyclic redundancy check (CRC) and parity check (PRC) codes. In addition, some error-correcting codes (ECC) such as the Reed Solomon codes also provide error detection capabilities. In certain embodiments, each receiver can determine whether the data components are received error-free. When the receiver assembles the data component to transmit to the client, the quality indicator of the data component can be represented by a simple flag that indicates the bits in the data component are error-free.

As noted above, methods of indicating quality which do not use coding techniques may also be used. For example, in some embodiments, the receivers estimate the SNR at a particular time that is associated with each data component. The highest quality data component is that having the highest SNR according to this embodiment. SNR estimations are well known to those of ordinary skill in the data communication arts and are easily implemented according to this embodiment.

Systems of the disclosed apparatus enable receipt, and thus use by the client, of data having a higher quality (and hence a quality indicator) due to the spatial diversity technique utilized. Nevertheless, while the disclosed apparatus itself facilitates receipt of data with fewer errors, it is to be understood that other error reduction techniques can be used simultaneously. For example, such techniques include: increasing transmitter power levels, reducing bit rate, use of coding such as forward error correcting (FEC) coding, use of directional antennas with antenna pointing, and use of other diversity techniques. Any suitable combination of techniques for combating errors can be used to increase overall performance. As those skilled in the data communication arts shall recognize, any other convenient error reduction techniques can be used to practice the disclosed method and apparatus The composite signal formed according to the disclosed method and apparatus can be viewed at the location of the client or directed to another location (terrestrial-based or aerial-based) for viewing by one or more individuals. The composite signal can be input to one or more apparatus. Prior to viewing the image, the data may be formatted for display or used as desired and according to techniques known to those skilled in the visual and communications arts. For example, the composite signal may provide a real-time data stream of remote imagery to Web-based browsers using the well known Internet. This type of application is particularly desirable when transmitting video imagery for reconnaissance or other purposes using, e.g., UAVs.

A schematic representation of an exemplary system 100 of the disclosed apparatus is shown in FIG. 1. It is to be understood that the system illustrated therein is not drawn to scale and is merely represented in an elementary form. A communication system (the details of which are not shown) in an aircraft 10 illustrated therein functions as a transmission source. The aircraft communication system transmits a digital bit stream that is received by two or more ground-based receivers 12, 14, which are sufficiently spaced apart from each other thereby providing spatial diversity.

In a further embodiment, the system 100 illustrated in FIG. 1 is used for receipt of digitized video information transmitted from the aircraft 10. According to one variation of this embodiment, the receivers 12 and 14 are positioned on opposite sides of the area of operation of the aircraft. As such, the receivers 12, 14 can be separated from each other by great distances. For example, in one embodiment, the receivers 12, 14 are separated by more than 320 kilometers (200 miles).

With the arrangement of this embodiment, the transmission area of greatest interest is likely near a position, which is represented in FIG. 1 by a vertical dotted line 20, positioned approximately halfway between the receivers 12 and 14. If the aircraft 10 embarks from near the location of one receiver 12, it is very possibly out of range of the second receiver 14, and vice versa. However, as the aircraft 10 approaches the line 20, indicative of the area of greatest interest, it is at a sufficient distance from each of the two receivers 12 and 14 that the transmission signal strength is reduced to the extent that any seemingly small signal degradation caused by multipath reflections, interference or shadowing, may cause significant errors in the received data. Although the same transmission signal is conveyed to each receiver 12, 14, propagation loss, multipath reflections, interference and shadowing that the signal is exposed to are often different at each of the receivers 12, 14 because the receivers 12 and 14 are positioned in different locations. Each of the transmission source and the receivers 12, 14 may be modified to include error control techniques previously described, including forms of diversity other than the spatial diversity described in more detail herein. Even so, quality of the data received by each receiver 12, 14 will vary.

FIG. 1 is useful for understanding how the present disclosed method and apparatus reduces disruptions caused by shadowing. For example, suppose that the aircraft 10 circles the area of interest residing proximate line 20. Typically, if the aircraft 10 is a conventional airplane, upon circling, the aircraft 10 banks to create a shadowing situation. In most cases, such shadowing impacts the quality of transmission to only one receiver 12, 14 at a time. Thus, a client 22 that is networked to the receivers 12 and 14 via a communication network 24, which is based on IP in an exemplary embodiment, is likely able to extract useful data (i.e., that having the highest quality indicator) virtually all of the time that the aircraft 10 circles the area of interest. If the quality of data transmission is adversely affected (by shadowing) for one receiver (e.g., receiver 12), the client 22 may simply ignore the data transmitted by that receiver (e.g., receiver 12), and instead retain the data transmitted by the receiver that is not so affected (e.g., receiver 14).

FIG. 1 is also useful for understanding how the present disclosed apparatus reduces disruptions caused by interference. According to another variation in illustrating benefits obtainable with the disclosed apparatus, systems such as the system 100 illustrated in FIG. 1 might also be subjected to a source of interference such as, for example, a radar system (not shown). If the source of interference is a swept radar system, for example, the signal emitted by the radar changes direction over time. As such, when the radar interferes with one receiver, 12 or 14, it typically does not interfere with the other respective receiver, 14 or 12. If the source of interference comprises a pulsed radar system, for example, the signal emitted by the pulsed radar might interfere with both systems simultaneously. However, the radar transmitter (not shown) would often be much closer to one receiver, 12 or 14, than it would be to the other respective receiver, 14 or 12. As such, if the radar causes a serious interference problem with one receiver, 12 or 14, its impact on the other respective receiver, 14 or 12, would typically be minimal. The net result is that the client 22 can very often produce an essentially error-free composite signal from the error-containing signals received by the individual receivers 12 and 14. In the system 100 shown in FIG. 1, the client 22 includes an integral display 26 for viewing of the transmitted video imagery from the aircraft 10. The transmitted video imagery is able to be effectively viewed in real-time.

The system 100 illustrated in FIG. 1 also helps to minimize disruptions caused by multipath reflections. Because the nature of multipath reflection geometry is typically much different at the two receivers 12 and 14 due to their different locations, irreconcilable errors introduced by multipath reflections are minimized or eliminated.

Figure 2:
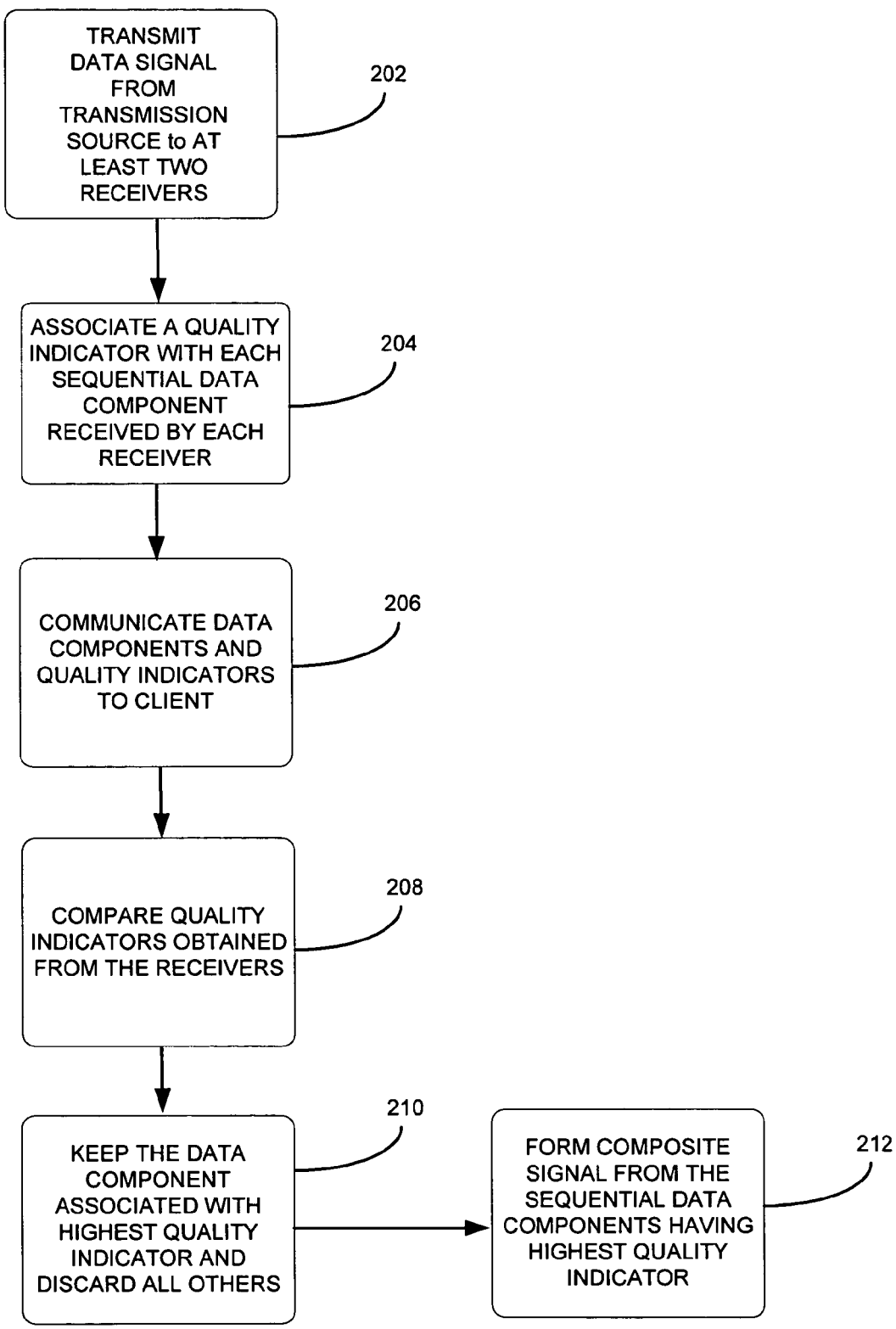
FIG. 2 is a flowchart of a method of transmitting data from a transmission source to spatially diverse receivers.

FIG. 2 shows a flowchart of a method 200 of transmitting data from a transmission source to spatially diverse receivers in accordance with the present teachings. As shown in FIG. 2, the method 200 begins at a STEP 202 whereat the method transits a data signal from a transmission source to at least two receivers. The method 200 proceeds to a STEP 204 whereat the method associates a quality indicator with each sequential data component received by each receiver. As noted above with reference to FIG. 1, the quality indicator may be determined using any suitable method, such as, for example, incorporating at least one error-detecting code in the transmitted data signal. In another exemplary embodiment, the quality indicator may be determined using signal-to-noise ratio estimates. The method 200 then proceeds to a STEP 206 whereat the method communicates the data components and the associated quality indicators to a client. As described above with reference to FIG. 1, in one exemplary embodiment, the at least two receivers communicate with the client using a communication network, as needed. In one embodiment, the communication network comprises a network adhering to the well known Internet Protocol.

As shown in FIG. 2, the method 200 proceeds to a STEP 208 whereat the quality indicators obtained from the at least two receivers are compared. The method 200 then proceeds to a STEP 210 whereat the method keeps the data component associated with a highest quality indicator, and discards all other data components. The method 200 then proceeds to a STEP 212 whereat a composite signal is formed from the sequential data components having the highest quality indicator.

Various modifications and alterations of the disclosed data transmission method and apparatus will become apparent to those skilled in the art of data transmission without departing from the spirit and scope of the present teachings, which is defined by the accompanying claims. The appended claims are to be construed accordingly. For example, while spatial diversity with networked receivers according to the disclosed data transmission method and apparatus provides improvements in accuracy and reliability of data transmission, other methods for optimizing the same can be used in conjunction with systems of the disclosed method and apparatus. For example, other diversity techniques can be used in conjunction with the spatial diversity employed according to the disclosed apparatus. It should also be noted that steps recited in any method claims below do not necessarily need to be performed in the order that they are recited. Those of ordinary skill in the art will recognize variations in performing the steps from the order in which they are recited.

The invention claimed is:

1. A system for transmission of data, the system comprising:
    an aerial based transmission source configured at least to transmit a data signal, the data signal comprising at least one data signal portion corresponding to digital data packets, at least some of the data packets including a source sequence of data components of compressed video data;
    a first receiver configured at least to receive the data signal and to communicate a first relayed sequence of data components corresponding to the source sequence of data components via a communication network;
    a second receiver configured at least to receive the data signal and to communicate a second relayed sequence of data components corresponding to the source sequence of data components via the communication network, wherein the second receiver is positioned a physical distance apart from the first receiver thereby providing spatial diversity; and
    at least one client device, the client device configured to, at least:
        receive the first relayed sequence of data components via the communication network,
        receive the second relayed sequence of data components via the communication network,
        choose between data components of the first and second relayed sequences having corresponding sequence identifiers at least in part by comparing quality indicators for at least some of the data components of the first and second relayed sequences,
        discard the data components not chosen,
        form a composite data packet stream at least in part by combining the chosen data components in sequence order, wherein the chosen data components comprise those respective data components of the first and second relayed sequences having highest comparative quality indicators, and
        decompress the composite data packet stream of compressed video data.

2. The system of claim 1, further comprising a plurality of client devices, wherein the first receiver and the second receiver are further configured to communicate the respective sequences of data components via multicast to the plurality of client devices.

3. The system of claim 1, further comprising a third receiver configured at least to receive the transmitted data signal and to communicate a third relayed sequence of data components corresponding to the source sequence of data components via the communication network, wherein the third receiver is located at a first distance from the first receiver, at a second distance from the second receiver, and the first distance and the second distance are unequal.

4. The system of claim 1, wherein the at least some of the data packets include a sequence number associated with the source sequence of data components of compressed video data.

5. The system of claim 1, wherein the second receiver is positioned at least one-hundred kilometers apart from the first receiver.

6. The system of claim 1, wherein the communication network communicates utilizing Internet Protocol (IP) communication protocols.

7. The system of claim 1, wherein the quality indicator is determined using at least one error-detecting code or signal-to-noise ratio estimates.

8. The system of claim 1, wherein the composite data packet stream comprises error-free sequential data components obtained from the first and second receivers.

9. The system of claim 1, wherein the first receiver and the client device are integrated into one physical component.

10. The system of claim 1, wherein the aerial based transmission source is configured at least to transmit the data signal from an altitude greater than two thousand meters.

11. A method of transmitting data, the method comprising:
    transmitting a data signal from an aerial based transmission source to at least two receivers, wherein a first receiver of the at least two receivers is spaced apart from a second receiver of the at least two receivers thereby providing spatial diversity, and wherein the data signal includes at least one data signal portion corresponding to digital data packets including a plurality of sequential data components of compressed video data;
    associating a quality indicator with each received sequential data component;
    communicating the received data components and associated quality indicators from the first and second receivers to a client through a communication network;
    comparing the quality indicators associated with each received sequential data component at the client;
    for each element of a sequence associated with the sequential data components, discarding received sequential data components other than a received sequential data component having a highest quality indicator;
    forming a composite data packet stream from the retained sequential data components; and
    decompressing the composite data packet stream of compressed video data.

12. The method of claim 1, further communicating the data components and associated quality indicators from the first and second receivers to a plurality of clients via multicasting through the communication network.

13. The method of claim 11, wherein the decompressing is performed by the first and second receivers prior to the first and second receivers communicating decompressed data components and associated quality indicators to the client.

14. The method of claim 11, wherein communicating the data components and the associated quality indicators from the first and second receivers to the client comprises using Internet Protocol (IP) communication protocols.

15. The method of claim 11, wherein associating the quality indicator with each sequential data component comprises using an error-detecting code.

16. The method of claim 11, further comprising receiving the sequential data components out of order at the client from the first and second receivers, wherein forming the composite signal comprises re-ordering the sequential data components having the highest quality indicators prior to the decompressing.

17. A computer-implemented method for receiving video transmitted by an aerial based transmission source to a plurality of spatially diverse receivers comprising:
    receiving a first sequence of digitized video frames corresponding to the transmitted video;
    receiving a second sequence of digitized video frames corresponding to the transmitted video;
    identifying a first digitized video frame in the first sequence corresponding to a second digitized video frame in the second sequence, the correspondence being at least with respect to sequence order;

identifying a first quality indicator for the first digitized video frame;

identifying a second quality indicator for the second digitized video frame;

determining that the first digitized video frame is of a higher quality than the second digitized video frame at least in part by comparing the first quality indicator to the second quality indicator;

selecting the first digitized video frame for inclusion in a composite digitized video data stream;

discarding the second digitized video frame; and storing the composite digitized video data stream in a computer-readable storage medium for display.

18. The method of claim 17, further comprising:

receiving a third sequence of digitized video frames corresponding to the transmitted video;

identifying a third digitized video frame in the third sequence corresponding to the first and second digitized video frames;

identifying a third quality indicator for the third digitized video frame; and determining that the first digitized video frame is of a higher quality than the second and third digitized video frames at least in part by comparing the first quality indicator to the second and third quality indicators.

19. The method of claim 17, wherein:

the first sequence of digitized video frames comprises compressed video frames;

the method further comprises:

selecting further digitized video frames for inclusion in the composite digitized video data stream so that the composite digitized video data stream is decompressible; and decompressing the composite digitized video data stream.

* * * * *